(12) United States Patent
Harris

(10) Patent No.: US 10,887,305 B1
(45) Date of Patent: Jan. 5, 2021

(54) METHOD AND APPARATUS FOR GENERATING AND PROVIDING A TEMPORARY PASSWORD TO CONTROL ACCESS TO A RECORD CREATED IN RESPONSE TO AN ELECTRONIC MESSAGE

(71) Applicant: McKesson Corporation, Irving, TX (US)

(72) Inventor: Patrick Harris, Brookhaven, GA (US)

(73) Assignee: MCKESSON CORPORATION, Irving, TX (US)

( * ) Notice: Subject to any disclaimer, the term of this patent is extended or adjusted under 35 U.S.C. 154(b) by 355 days.

(21) Appl. No.: 15/941,762

(22) Filed: Mar. 30, 2018

(51) Int. Cl.
*H04L 29/06* (2006.01)
*G06Q 20/38* (2012.01)
*G06F 21/62* (2013.01)

(52) U.S. Cl.
CPC ...... *H04L 63/0846* (2013.01); *G06F 21/6218* (2013.01); *G06Q 20/385* (2013.01)

(58) Field of Classification Search
CPC . H04L 63/0846; H04L 41/12; H04L 63/0281; H04L 63/0876; G06F 21/6218
See application file for complete search history.

(56) References Cited

U.S. PATENT DOCUMENTS

| | | | | |
|---|---|---|---|---|
| 6,529,801 B1 * | 3/2003 | Rosenblum | ............. | G06F 19/00 700/237 |
| 7,401,133 B2 * | 7/2008 | Huang | ................ | G06F 9/44505 709/220 |
| 8,166,310 B2 * | 4/2012 | Harrison | ............. | H04L 63/0838 713/184 |
| 8,635,673 B2 * | 1/2014 | Anand | .................. | G06F 21/629 726/4 |
| 9,781,102 B1 * | 10/2017 | Knjazihhin | ........... | H04L 63/102 |
| 2003/0177361 A1 * | 9/2003 | Wheeler | ............. | H04L 63/0428 713/176 |
| 2005/0165627 A1 * | 7/2005 | Fotsch | ................... | G16H 10/60 705/3 |
| 2005/0165829 A1 * | 7/2005 | Varasano | ............... | G06Q 50/00 |
| 2013/0232482 A1 * | 9/2013 | Hassan | ..................... | G06F 8/71 717/178 |
| 2013/0256403 A1 * | 10/2013 | MacKinnon Keith | ...................... | G06Q 20/3821 235/375 |
| 2015/0142529 A1 * | 5/2015 | Morita | ................... | G06Q 40/00 705/7.38 |

\* cited by examiner

*Primary Examiner* — Ali S Abyaneh
*Assistant Examiner* — Shu Chun Gao
(74) *Attorney, Agent, or Firm* — Alston & Bird LLP

(57) ABSTRACT

A method, computing device and computer program product generate a temporary password to control access to a record created in response to an electronic message. An electronic message is parsed to separately identify a plurality of fields that provide different types of information. Record(s) are accessed from a database that are associated with the information provided by at least one field. An action to be initiated by the electronic message is determined to either be taken or to be rejected based upon information provided by the field(s) of the electronic message and also based upon information from the record(s) accessed from the database. If the action is rejected, a record of the electronic message is created for transmission along with information regarding the rejection. A temporary password is also generated to control access to the record created regarding the electronic message and its rejection. The response includes the temporary password.

20 Claims, 4 Drawing Sheets

METHOD AND APPARATUS FOR GENERATING AND PROVIDING A TEMPORARY PASSWORD TO CONTROL ACCESS TO A RECORD CREATED IN RESPONSE TO AN ELECTRONIC MESSAGE

TECHNOLOGICAL FIELD

An example embodiment of the present invention relates to securing access to a record and, more particularly, to generating and providing a temporary password to control access to a record created in response to an electronic message.

BACKGROUND

Access to information stored online is oftentimes private and, as such, should only be accessed by an authorized group of people. For example, some web sites or web portals require the entry of a user name and password prior to permitting access to information via the website or the web portal. Thus, people who do not have an authorized user name and an authorized password cannot access information via the web site or web portal.

In order to further secure the information, user names and passwords that permit access to the information accessible via a web site or web portal may only be provided to people serving a particular role, such as healthcare professionals, business executives of a certain level, military personnel of a certain rank or the like. By limiting the distribution of user names and passwords to only people serving a particular role, the authorized access to information via a website or web portal is further secured.

Notwithstanding these protective measures, the provision of user names and passwords and, as a result, the authorization of access rights to people serving a particular role may permit some people who do not have a legitimate reason to access the information via the website or web portal to, in fact, access the information. As a result, the possibility exists for people who are authorized to access the information via a website or web portal, but who do not have a legitimate use for the information to use the information for personal gain or other nefarious purposes.

BRIEF SUMMARY

A method, computing device and computer program product are provided in order to generate and provide a temporary password to control access to a record created in response to an electronic message. Thus, even in an instance in which a group of people, such as people that serve a particular role, are generally permitted access to information available, such as via a web site or a web portal, as a result of the assignment of user names and passwords to the group of people, access can be further controlled by also requiring entry of a temporary password. In an example embodiment, this temporary password may only be provided in response to the creation of a record following processing of an electronic message, such as an electronic message originating with person who is provided the temporary password. Additionally, the temporary password may be temporally limited and, as such, may only be valid for a period of time that is dependent upon a time associated with the electronic message or the response to the electronic message. Thus, the information generated in response to the electronic message and accessible, for example, via a web site or a web portal, may be further protected, even among a limited group of people to whom passwords and user names have been assigned, with the temporary passwords.

In an example embodiment, a computing device is provided that is configured to generate and provide a temporary password to control access to a record created in response to an electronic message. The computing device includes a communication interface configured to receive electronic messages, at least one database and processing circuitry. For a respective electronic message, the processing circuitry is configured to parse the electronic message to separately identify a plurality of fields of the electronic message providing different types of information. The processing circuitry is also configured to access one or more records from the at least one database that are associated with the information provided by at least one field of electronic message. The processing circuitry is configured to determine whether an action to be initiated by the electronic message is to be taken or is to be rejected based upon information provided by one or more fields of the electronic message and also based upon information from one or more records accessed from the at least one database that are associated with the information provided by at least one field of the electronic message. In an instance in which the action is determined to be rejected, the processing circuitry is configured to create the record of the electronic message and information regarding a rejection of the action to be initiated by the electronic message. The processing circuitry is also configured to generate the temporary password to facilitate controlled access to the record created regarding the electronic message and the information regarding the rejection and to construct a response to the electronic message that is to be transmitted. The response includes the temporary password. The at least one database is also configured to store one or more of the electronic message, the record created regarding the electronic message and the information regarding the rejection or the response to the electronic message.

The processing circuitry of an example embodiment is configured to generate the temporary password so as to be temporally limited. In an example embodiment, the processing circuitry is configured to construct the response to include an indication of the rejection with less information regarding the rejection than is included within the record that has been created. The processing circuitry of an example embodiment is further configured to permit access to the information regarding the rejection that is included within the record that is created in a manner that is controlled based upon the temporary password.

The processing circuitry of an example embodiment is configured to parse the electronic message to identify a first field identifying a purchaser of a product or service, a second field identifying the product or service and a third field identifying a quantity associated with the product or service. In this embodiment, the processing circuitry is configured to access one or more records from the at least one database that are associated with the purchaser identified by the first field of the electronic message. The processing circuitry of this example embodiment is also configured to determine whether the action to be initiated by the electronic message is to be taken or is to be rejected based upon an analysis of one or more of the product or service or the quantity identified by the second and third fields, respectively, of the electronic message and information from the one or more records accessed from the at least one database that are associated with the purchaser identified by the first field of the electronic message. For example, the processing circuitry may be configured to determine that the action is to be rejected due to a drug-to-drug interaction or overutilization identified by the analysis.

In another example embodiment, a method is provided for generating and providing a temporary password to control access to a record created in response to an electronic message. The method receives electronic messages and, for a respective electronic message, parses the electronic message to separately identify a plurality of fields of the electronic message providing different types of information. The method also accesses one or more records from the at least one database that are associated with the information provided by at least one field of electronic message. The method determines whether an action to be initiated by the electronic message is to be taken or is to be rejected based upon information provided by one or more fields of the electronic message and also based upon information from one or more records accessed from the at least one database that are associated with the information provided by at least one field of the electronic message. In an instance in which the action is determined to be rejected, the method creates the record of the electronic message and information regarding a rejection of the action to be initiated by the electronic message. The method also generates the temporary password to facilitate controlled access to the record created regarding the electronic message and the information regarding the rejection and constructs a response to the electronic message that is to be transmitted. The response includes the temporary password. The method also stores, in at least one database, one or more of the electronic message, the record created regarding the electronic message and the information regarding the rejection or the response to the electronic message.

The method of an example embodiment generates the temporary password so as to be temporally limited. In an example embodiment, the method constructs the response to include an indication of the rejection with less information regarding the rejection than is included within the record that has been created. The method of an example embodiment also permits access to the information regarding the rejection that is included within the record that is created in a manner that is controlled based upon the temporary password.

The method of an example embodiment parses the electronic message to identify a first field identifying a purchaser of a product or service, a second field identifying the product or service and a third field identifying a quantity associated with the product or service. In this embodiment, the method accesses one or more records from the at least one database that are associated with the purchaser identified by the first field of the electronic message. The method of this example embodiment also determines whether the action to be initiated by the electronic message is to be taken or is to be rejected based upon an analysis of one or more of the product or service or the quantity identified by the second and third fields, respectively, of the electronic message and information from the one or more records accessed from the at least one database that are associated with the purchaser identified by the first field of the electronic message. For example, the method may determine that the action is to be rejected due to a drug-to-drug interaction or overutilization identified by the analysis.

In a further example embodiment, a computer program product is provided that is configured to parse and differently process electronic messages. The computer program product includes a non-transitory computer readable medium having program code stored thereon with the program code comprising program code instructions configured, upon execution, to receive electronic messages and, for a respective electronic message, to parse the electronic message to separately identify a plurality of fields of the electronic message providing different types of information. The program code also includes program code instructions configured, upon execution, to access one or more records from the at least one database that are associated with the information provided by at least one field of electronic message. The program code also includes program code instructions configured, upon execution, to determine whether an action to be initiated by the electronic message is to be taken or is to be rejected based upon information provided by one or more fields of the electronic message and also based upon information from one or more records accessed from the at least one database that are associated with the information provided by at least one field of the electronic message. In an instance in which the action is determined to be rejected, the program code also includes program code instructions configured, upon execution, to create the record of the electronic message and information regarding a rejection of the action to be initiated by the electronic message. The program code also includes program code instructions configured, upon execution, to generate the temporary password to facilitate controlled access to the record created regarding the electronic message and the information regarding the rejection and to construct a response to the electronic message that is to be transmitted. The response includes the temporary password. The program code further includes program code instructions configured, upon execution, to store, in at least one database, one or more of the electronic message, the record created regarding the electronic message and the information regarding the rejection or the response to the electronic message.

The program code of an example embodiment includes program code instructions configured, upon execution, to generate the temporary password so as to be temporally limited. In an example embodiment, the program code instructions are configured, upon execution, to construct the response to include an indication of the rejection with less information regarding the rejection than is included within the record that has been created. The program code of an example embodiment also includes program code instructions configured, upon execution, to permit access to the information regarding the rejection that is included within the record that is created in a manner that is controlled based upon the temporary password.

The program code of an example embodiment includes program code instructions configured, upon execution, to parse the electronic message to identify a first field identifying a purchaser of a product or service, a second field identifying the product or service and a third field identifying a quantity associated with the product or service. In this embodiment, the program code instructions are configured, upon execution, to access one or more records from the at least one database that are associated with the purchaser identified by the first field of the electronic message. The program code of this example embodiment also includes program code instructions configured, upon execution, to determine whether the action to be initiated by the electronic message is to be taken or is to be rejected based upon an analysis of one or more of the product or service or the quantity identified by the second and third fields, respectively, of the electronic message and information from the one or more records accessed from the at least one database that are associated with the purchaser identified by the first field of the electronic message. For example, the program code instructions may be configured, upon execution, to determine that the action is to be rejected due to a drug-to-drug interaction or overutilization identified by the analysis.

BRIEF DESCRIPTION OF THE DRAWINGS

Figure 1:
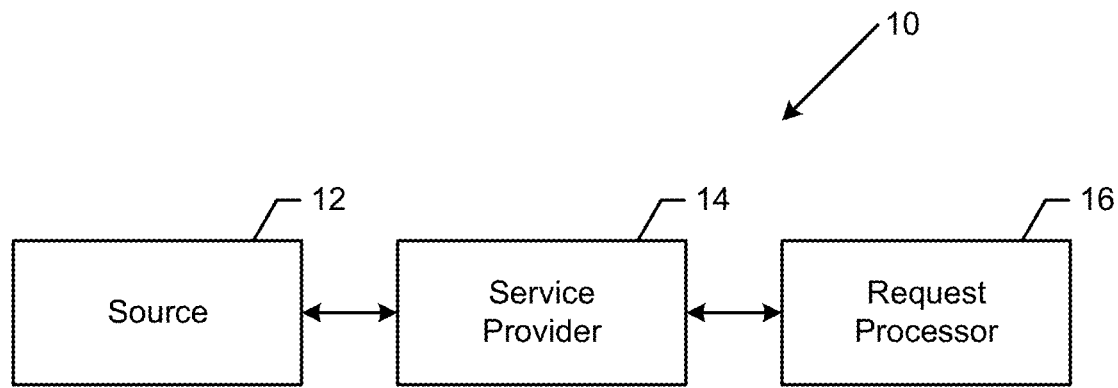
Figure 2:
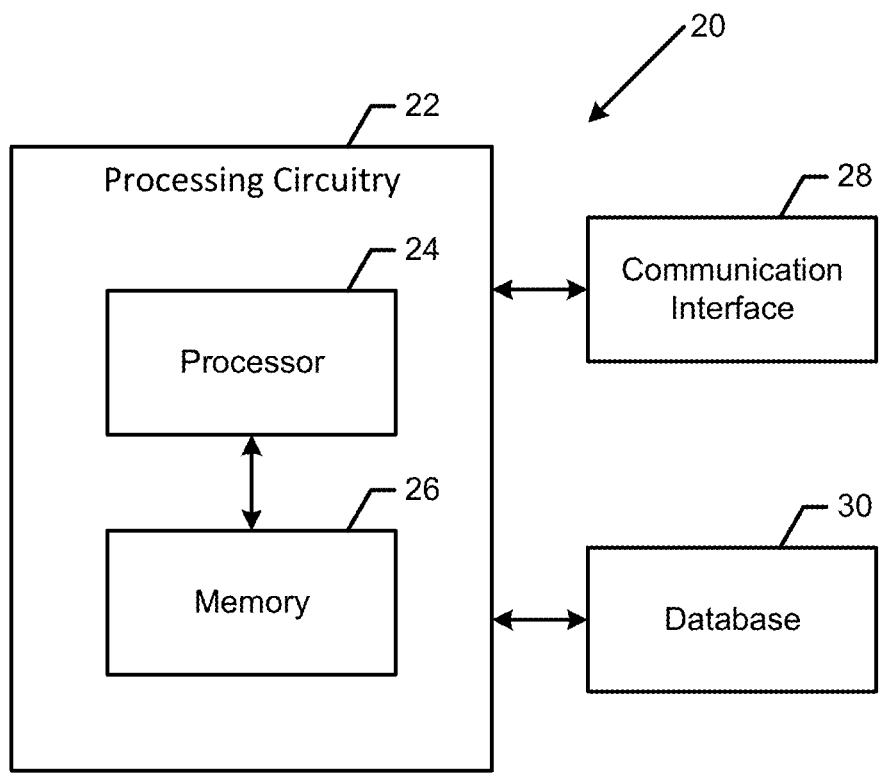
Figure 3:
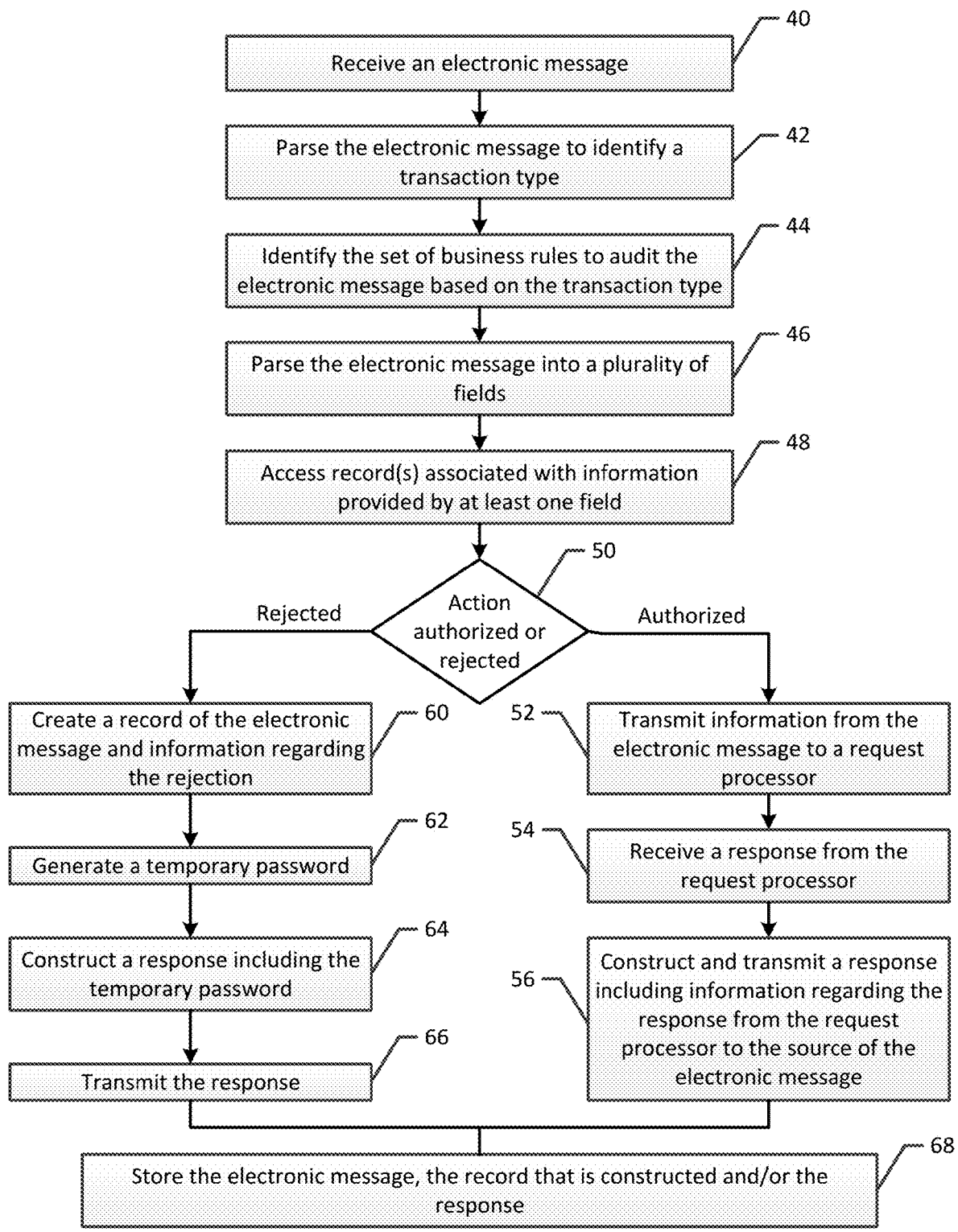
Figure 4:
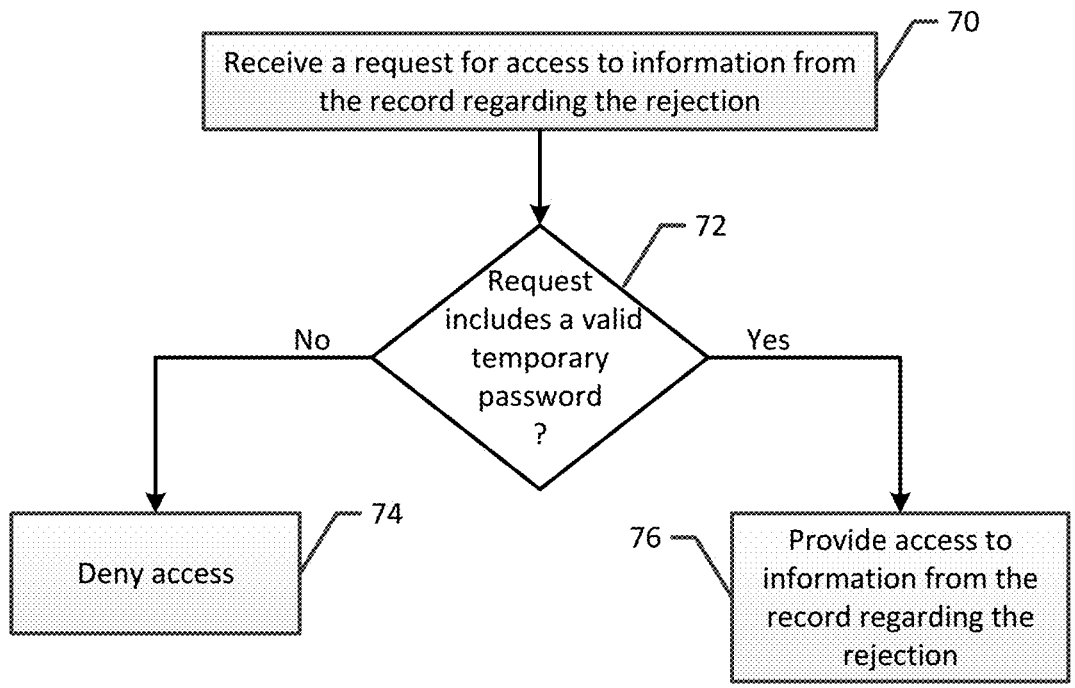
Figure 5:
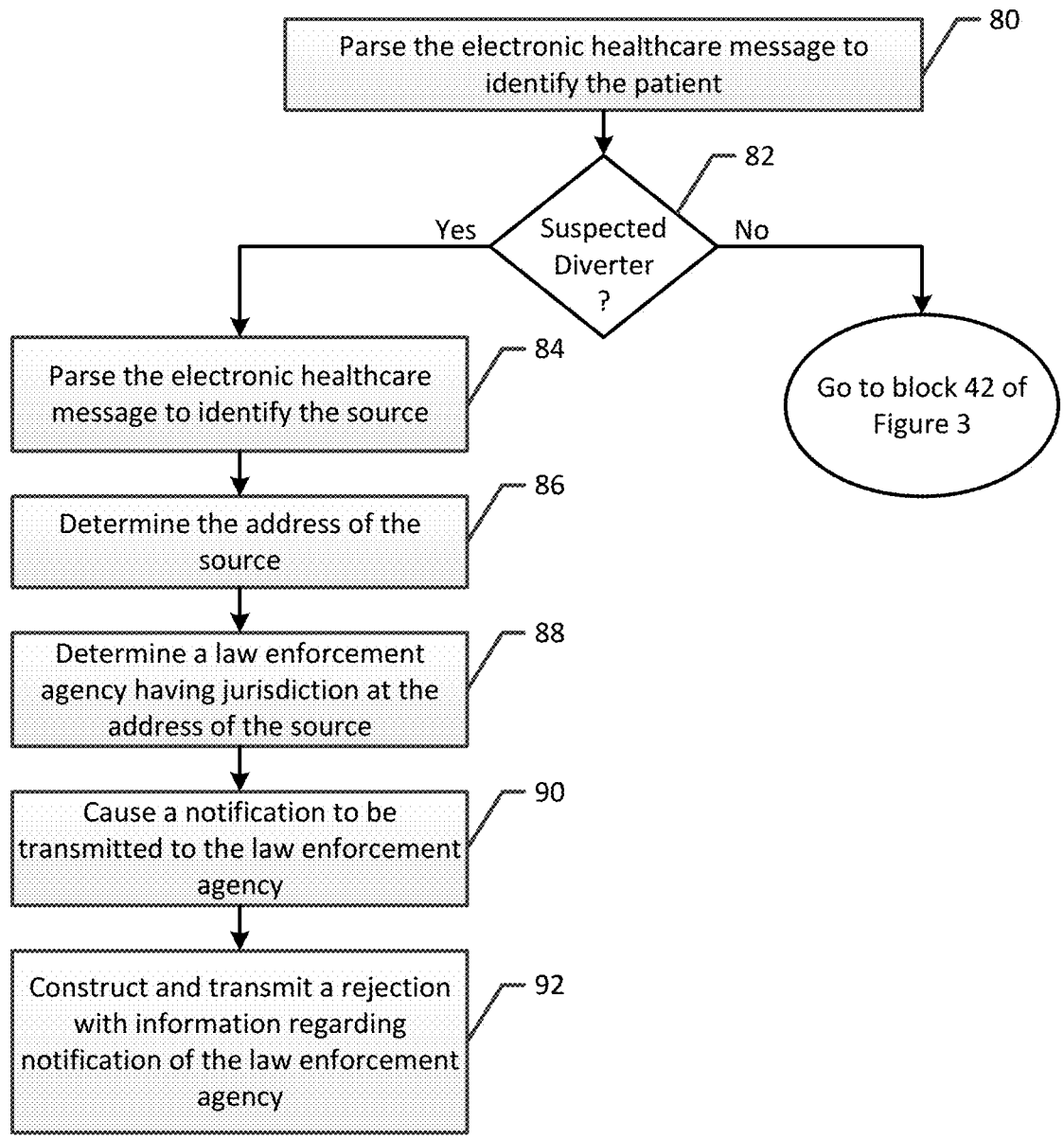

Having thus described certain embodiments of the invention in general terms, reference will now be made to the accompanying drawings, which are not necessarily drawn to scale, and wherein:

FIG. 1 is a diagram of a system configured to utilize temporary passwords to control access to records created in response to electronic messages in accordance with an example embodiment of the present invention;

FIG. 2 is a block diagram of a computing device that may be specifically configured in accordance with an example embodiment of the present invention;

FIG. 3 is a flow chart illustrating the operations performed, such as by the switch, e.g., router, of FIG. 1 embodied by the computing device of FIG. 2, in order to process an electronic message and, in an instance in which the action otherwise to be initiated by the electronic message is rejected, to generate a temporary password in accordance with an example embodiment of the present invention;

FIG. 4 is a signal flow diagram illustrating the messages exchanged in accordance with an example embodiment of the present invention; and FIG. 5 is a flow chart illustrating the operations performed, such as by the switch, e.g., router, of FIG. 1 embodied by the computing device of FIG. 2, in accordance with another example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, computing device, and computer program product are provided in accordance with an example embodiment in order to generate and provide a temporary password to control access to a record created in response to an electronic message. Thus, even in an instance in which a group of people, such as people that serve a particular role, are generally permitted access to information available, such as via a web site or a web portal, as a result of the assignment of user names and passwords to the group of people, access to information from the record created in response to the electronic message is further controlled by also requiring entry of a temporary password. In an example embodiment, this temporary password may only be provided in response to the creation of a record following processing of an electronic message, such as an electronic message originating with person who is provided the temporary password. Additionally, the temporary password may be temporally limited and, as such, may only be valid for a period of time that is dependent upon a time associated with the electronic message or the response to the electronic message. Thus, the information generated in response to the electronic message and accessible, for example, via a web site or a web portal, is further protected with the temporary password.

By way of example, a system 10 that is configured to process electronic messages and, in an instance in which the action otherwise to be initiated by the electronic message is rejected, to generate a temporary password that is utilized to limit subsequent access to information from the record generated in response to the electronic message is depicted in FIG. 1. For example, information regarding the reason for rejection of an action otherwise to be initiated by the electronic message may be included in the record generated in response to the electronic message and may only be accessible to a person possessing the temporary password that was generated during processing of the electronic message. As shown, the electronic message may be provided by a source 12 and received by a service provider 14, such as a switch, e.g., a router. After parsing the different portions of the electronic message provided by the source, the service provider is configured to determine whether the action to be initiated by the electronic message should be performed and, if so, communicates with a request processor 16 prior to responding to the source. Conversely, in an instance in which the service provider determines that the action requested by the electronic message is to be rejected, a record is created including the reason for the rejection and a temporary password is generated and associated with the record. The service provider then provides a response indicating that the requested action has been rejected and includes the temporary password, but not the reason for rejection, in the response. The source may then obtain further information regarding the rejection, such as the reason for rejection, by utilizing the temporary password, although other people cannot similarly access the information without the temporary password.

Although the method, computing device and computer program product may be employed in various applications, the method, computing device and computer program product of example embodiments are employed in conjunction with electronic messages seeking to invoke an action that may be rejected in certain circumstances. For example, the electronic messages may be communicated and processed in conjunction with telecommunication applications, content delivery and provisioning and healthcare applications, such as in conjunction with the submission and evaluation of prescription and/or medical claims, such as a prescription claim and/or a medical claim submitted by a pharmacy management system, and the provision of feedback regarding reimbursement of the pharmacy by a claims payor, e.g., an insurance company or the like, to name but a few.

The service provider 14 may be configured in various manners, but, in one embodiment, the service provider includes a computing device 20 configured to parse an electronic message and to determine whether to take the action requested by the electronic message or to issue a rejection along with a temporary password to control access to the reason for the rejection. The computing device may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the source 12 and the request processor 16, such as one or more input/output (I/O) interfaces. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database 30 includes information accessed and stored by the processing circuitry 22 to facilitate the operations of the service provider 14. For example, the database 30 may comprise a series of tables configured to store data received from one or more other entities and/or information regarding different types of messages and/or portions of different types of messages as described below.

The operations performed by the computing device 20 embodied by the service provider 14 are depicted in accordance with an example embodiment in FIG. 3. As shown in block 40 of FIG. 3, the computing device of an example embodiment, such as the processing circuitry 22, the processor 24, the communication interface 28 or the like, is configured to receive one or more electronic messages from a source 12. Although different types of electronic messages may be received depending upon the application, the electronic message may be an electronic healthcare message, such as a prescription claim request, medical claims request, predetermination of benefits request or the like, generated by a source, such as a pharmacy management system or a prescriber of medication or medical services, and directed to the service provider, e.g., switch or router, for processing and adjudication. In this embodiment, the electronic healthcare message typically includes information that identifies the patient, the medication, product, or service being requested, the healthcare provider (either the prescriber, pharmacy or both), and the benefit plan, insurer, or government-funded payor for the patient.

A pharmacy management system may be operated by a pharmacy in order to track the fulfillment of the various prescriptions and to submit prescription claims for reimbursement, requests for the predetermination of prescription benefits or the like via the service provider 14 to various claim processors in order to obtain an analysis of the prescription claim or other request submitted by the pharmacy management system and to identify, for example, the patient's out of pocket costs, typically in real time or near real time. In the context of a predetermination of prescription benefits request, the claims processor responds with an indication as to whether or not the prescription claim will be reimbursed and, if so, to what extent and the service provider, in turn, provides this information to the pharmacy management system. In light of the performance of an increasing number of medical services by a pharmacy or a medical clinic housed by a pharmacy, a pharmacy management system of an example embodiment may also be configured to submit medical claims for reimbursement, requests for the predetermination of medical benefits or the like. In an instance in which the service provider returns a response regarding the reimbursement expected for a particular prescription or medical service, a pharmacy management system may direct fulfillment of the prescription or delivery of the medical service and/or direct communication between a pharmacist or other provider and a patient regarding the cost of the prescription or medical service that is not reimbursable and that must be borne by the patient. Although described herein in conjunction with a pharmacy management system, certain prescribers or other sources may also similarly communicate with the service provider, such as in conjunction with the submission and adjudication of a prescription claim request, medical claims request, predetermination of benefits request or the like. As such, the subsequent discussion applies equally to electronic messages submitted by various types of sources including pharmacy management systems and other prescribers.

The electronic message includes a plurality of fields, each of which provides a different type of information. Although different types of electronic messages may include different fields, the electronic message of one example embodiment includes the following fields:

Purchase Plan Identifier—Payor ID/Routing Information
    BIN Number (i.e. Banking Identification Number); BIN Number and Processor Control Number (PCN); BIN Number and Group ID; BIN Number, PCN and Group ID; BIN Number, PCN, Group ID, and Cardholder ID (of purchaser); BIN Number, PCN, Group ID, Cardholder ID (of purchaser), Relationship Code (of purchaser), and Person Code (of purchaser); and/or BIN Number, PCN, Group ID, Cardholder ID (of purchaser), Relationship Code (of purchaser), Person Code (of purchaser), Purchaser Date of Birth, and Purchaser Gender that designates a destination (e.g., the purchase processor computer 108) of the electronic product request 204

Purchaser Information
    Name (e.g. Purchaser Last Name, Purchaser First Name, etc.)

Date of Birth of Purchaser
Gender of Purchaser
Purchaser Address (e.g. Street Address, Zip Code, etc.)
Purchaser Contact Information (e.g. purchaser telephone number, email address, etc.)
Purchaser ID or other identifier (e.g., driver's license number, social security number, Health Insurance Claim Number (HICN), etc.)
Purchase Plan Information
   Cardholder Name (e.g. Cardholder First Name, Cardholder Last Name)
   Cardholder ID and/or other identifier (e.g. person code)
   Group ID and/or Group Information
Transaction Type
   Transaction Type Code (e.g., product purchase request (e.g., billing transaction), reversal transaction, e-script transaction, benefits determination request)
Prescriber of the Product Information
   Prescriber ID or other identifier (e.g. prescriber code)
   Prescriber Name (e.g. Last Name, First Name)
   Prescriber Contact Information (e.g. Telephone Number)
Merchant Information
   Merchant Information (e.g. store name, store address, chain identifier, etc.)
   Merchant ID (e.g. merchant code)
Product Information
   Product information—Product or service identifier (e.g. product code, UPC code, NDC code, etc.), product or service name, etc.
   Purchase Reference Number
   Quantity of Product to be Dispensed
   Days' Supply of the Product Purchased
   Pricing information for the product or service (e.g. ingredient cost (e.g., in an Ingredient Cost field), dispensing fee (e.g., in a Dispensing Fee field), gross amount due (e.g., in a Gross Amount Due field), and Usual and Customary Charge amount (e.g., in a Usual and Customary Charge field))
   Number of Refills Authorized
   Fill Number (i.e., the current refill number for the current request 204)
   Transaction Submission Date of the Electronic Product Request (the original date that the Electronic Product Request was electronically submitted to the evaluation computer 106.

As shown in block 42, the computing device 20 of an example embodiment includes means, such as the processing circuitry 22, the processor 24 or the like, for parsing the electronic message to determine a transaction type for the electronic message in one of the fields of the message. In one example, the transaction type can be a code that identifies the electronic message as an electronic healthcare message and, more particularly, as a prescription claims request, a medical claims request or a predetermination of benefits request. At block 44, the computing device includes means, such as the processing circuitry, the processor or the like for, identifying the set of business rules by which to audit the electronic message based on the transaction type. For example, the computing device, such as the processing circuitry, may be configured to compare the transaction type to a table or schedule of transaction types maintained, for example, by the at least one database 30 to identify a matching transaction type and, based on the match select a set of business rules used to examine or audit the electronic message.

As shown in block 46, the computing device 20, such as the processing circuitry 22, the processor 24 or the like, is configured to parse each or at least some of the electronic messages in order to separately identify the plurality of fields of a respective electronic message. Each field of the electronic message provides a different type of information. In an example embodiment, the computing device, such as the processing circuitry, is configured to parse the electronic message to identify a first field identifying a purchaser of a product or service, a second field identifying the product or service itself and a third field identifying a quantity associated with the product or service. In an embodiment in which the electronic message is an electronic healthcare message, such as a prescription claim request, medical claim request, predetermination of benefits request or the like, the business rules may dictate that the electronic healthcare message is to be parsed to identify a first field identifying a patient to which a medication or a medical procedure has been prescribed, a second field identifying the medication or the medical procedure and a third field identifying the quantity of the medication or the medical procedure that is prescribed. In terms of the medical procedure, the quantity may simply be 1 in an instance in which the medical procedure is only performed a single time, or a larger number in an instance in which the medical procedure is repeatedly performed. The electronic healthcare message may be parsed so as to identify additional fields in some embodiments including, for example, the time period during which a prescription is valid, the time period after which a prescription may be refilled, if at all, the name and/or other indicia of the healthcare professional prescribing the medication or proposing to render the medical treatment and/or the pharmacy or prescriber submitting the electronic healthcare request.

The computing device 20 of an example embodiment includes means, such as the processing circuitry 22, the processor 24 or the like, for accessing one or more records from the at least one database 30 that are associated with the information provided by at least one field of the electronic message. See block 48 of FIG. 3. For example, the computing device, such as a processing circuitry, may be configured to access one or more records from the at least one database that are associated with the purchaser identified by the first field of the electronic message. In an embodiment in which the electronic message is an electronic healthcare message, the computing device, such as the processing circuitry, may be configured to access one or more records stored by the at least one database and that are associated with the patient. In this regard, the database may store one or more records associated with the patient that provide the patient's medical history including prior prescriptions that have been filled, prior medical procedures that have been performed, prior requests for reimbursement or insurance coverage for medications, medical procedures or the like. In some instances, a single longitudinal record may be maintained by the at least one database storing the patient's entire medical history.

The computing device 20 includes means, such as the processing circuitry 22, the processor 24 or the like, for determining whether an action to be initiated by the electronic request is to be taken or is to be rejected based upon the information provided by one or more fields of the electronic message and also based upon information from one or more records accessed from the at least one database 30 that are associated with the information provided by at least one field of the electronic message. See block 50 of FIG. 3. In an example embodiment, the computing device, such as the processing circuitry, is configured to determine whether the action to be initiated by the electronic request is to be taken or is to be rejected based upon an analysis of one or more of the product or service and/or the quantity identified by the second and third fields, respectively, of the electronic message as well as information from the one or more records accessed from the at least one database that are associated with the purchaser identified by the first field of the electronic message. In this regard, the computing device, such as the processing circuitry, may be configured to determine whether the action to be initiated by the electronic message is be taken or is to be rejected based upon products or services previously provided to the purchaser and the quantity of the prior products or services provided to the purchaser.

In the context of an electronic healthcare message in the form of a prescription claim request or a predetermination of benefits request, the computing device 20, such as the processing circuitry 22, may be configured to determine whether a medication that is the subject of the electronic healthcare message is to be dispensed or whether the prescription for the medication is to be rejected based upon an analysis of medications previously dispensed to the patient and the quantities and timing at which the medication was previously dispensed to the patient. Alternatively, in the context of medical claim request or a predetermination of medical benefits request, the computing device, such as the processing circuitry, may be configured to determine whether a medical procedure that is the subject of the electronic healthcare message is to be provided or whether the medical procedure is to be rejected based upon an analysis of medical procedures previously provided to the patient and the quantity and timing at which the medical procedures were previously provided to the patient.

By way of example with respect to a prescription for medication, the computing device 20, such as the at least one database 30, may include a first table identifying the maximum quantity of different medications that may be provided to the patient during a respective period of time and/or a second table identifying two or more medications that may create an adverse drug-drug interaction if both medications were taken by the patient contemporaneously. In some embodiments, the second table may also identify the quantities of one or more of the medications that must be taken in order to potentially cause the adverse drug-drug interaction. In this example embodiment, the computing device, such as the processing circuitry 22, is configured to determine whether the medication that is the subject of the current electronic healthcare message would result in an overutilization of the medication if the medication is the subject of the current electronic healthcare message were dispensed and taken by the patient and/or if the medication is the subject of the current electronic healthcare message would create a risk of a drug-drug interaction with one or more medications that are being taken by the patient.

In an instance in which the action that is the subject of the electronic message is determined to be appropriate to be taken, such as in an instance in which the fulfillment of a prescription that is the subject of an electronic healthcare message is determined not to cause overutilization of the medication or an adverse drug-drug interaction, the computing device 20 includes means, such as the processing circuitry 22, the processor 24, the communications interface 28 or the like, for transmitting information derived from the electronic message to the request processor 16. See block 52. In an instance in which the electronic message is an electronic healthcare message, such as a prescription claim request, a medical claim request or a predetermination of benefits request, the request processor may determine the available coverage for the medication or medical service. The computing device may include means, such as the processing circuitry, the processor, the communication interface or the like, for receiving a response from the request processor identifying the coverage, if any, provided for the product or service, such as the prescription or medical service, that is the subject of the electronic message. See block 54. In the context of an electronic healthcare message, the response may provide an indication as to the coverage provided by the claims payor for the prescription or medical service that is the subject of the electronic healthcare message. If coverage is provided, the response may provide a reimbursement amount indicative of the monetary reimbursement amount to be provided by the claims payor in response to dispensation of the medicine or medical service. If coverage is not provided, however, the response may provide an indication as to the reason for denial of the prescription claims request, medical claims request or the predetermination of benefits request. Based upon the response from the claims processor, the computing device of this example embodiment includes means, such as the processing circuitry, the processor, the communications interface or the like, for constructing and then transmitting to the source 12 a response including information regarding the response from the request processor. See block 56. Thus, the source, such as a pharmacy management system is provided with information provided by the claims processor, such as an indication as to whether the claims payor provides coverage and, if so, the reimbursement amount associated therewith. In the context of a predetermination of prescription benefits request and based upon the response to the electronic healthcare message provided by the service provider 14, a pharmacist may proceed to dispense the medication that is the subject of the prescription in an instance in which the pharmacy is to be fully reimbursed by the claims payor or may counsel the patient as to the out-of-pocket amount that the payor must personally pay prior to dispensing the medication in an instance in which the reimbursement amount is less than the full cost of the medication.

However, in an instance in which the action is determined to be rejected, such as in an instance in which an electronic healthcare message relates to medication, the fulfillment of which will cause overutilization of the medication and/or an adverse drug-drug interaction, the computing device 20 includes means, such as the processing circuitry 22, the processor 24 or the like, for creating a record of the electronic message and information regarding the rejection of the action that is otherwise to be initiated by the electronic message. See block 60 of FIG. 3. The record that is created may then be stored in the at least one database 30. The record that is created may be a new record which may optionally be linked to the one or more records stored by the at least one database that are associated with the information provided by at least one field of the electronic message and that were previously accessed during analysis of the electronic message. Alternatively, one or more of the records from the at least one database that are associated with information provided by at least one field of the electronic message and were previously accessed during analysis of the electronic message may be updated with information regarding the electronic message and the rejection of the action to be otherwise initiated by the electronic message. In either embodiment, a record of the electronic message and its rejection is created. In the context of an electronic healthcare message, the record, such as the longitudinal record, associated with the patient and stored by the at least one database may be updated with information regarding the electronic healthcare message and information regarding the rejection of the action that is otherwise to be initiated by the electronic healthcare message, such as a request to fill a prescription. In this example embodiment, the information regarding the rejection may include information regarding the reason for which the request to fill a prescription was rejected, such as overutilization as well as an indication of the medications previously prescribed to the patient as well as the quantity and time associated with the medications that were previously provided to the patient that created the overutilization, and/or a drug-drug interaction along with an indication as to the one or more other medications that create the drug-drug interaction.

In accordance with an example embodiment, the computing device 20 also includes means, such as the processing circuitry 22, the processor 24 or the like, for generating a temporary password to facilitate controlled access to the record created regarding the electronic message and the information regarding the rejection. See block 62. In an example embodiment, the computing device, such as a processing circuitry, is configured to generate the temporary password so as to be temporally limited, such as a password whose validity is limited for a predefined period of time or until a predetermined time. The temporal limitation, such as the predefined period for which the temporary password is valid or the predetermined time at which the temporary password expires, is defined relative to the timing of the electronic message, such as the time at which the electronic message is received or the time at which the response to the electronic message is transmitted.

In an instance in which the action to be initiated by the electronic message is to be rejected, the computing device 20 also includes means, such as the processing circuitry 22, the processor 24 or the like, for constructing a response to the electronic message that is to be transmitted. See block 64 of FIG. 3. The response includes the temporary password and an indication that the action to be otherwise initiated by the electronic message has been rejected. In some embodiments, the computing device, such as the processing circuitry, is configured to construct the response to include an indication of the rejection, such as an indication as to why the action that is otherwise to be initiated by the electronic message was rejected, albeit with less information regarding the rejection, such as the basis for the rejection, than is included within the record that has been created. In an embodiment in which the electronic messages is an electronic healthcare message, the response may not only include the temporary password, but an indication that the prescription to be filled or the medical service to be performed has been rejected, albeit without information regarding the underlying rationale for the rejection. The computing device also includes means, such as the processing circuitry, the processor, the communication interface or the like, for transmitting the response to the electronic message, such as to the source 12 of the electronic message. See block 66.

As shown in block 68 and regardless of whether the action is authorized or rejected, the computing device 20, such as the processing circuitry 22, the processor 24, the at least one database 30 or the like, is also configured to store one or more of the electronic message, the record that is constructed in an instance in which the action is rejected and/or the response to the electronic message in the database. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

Following receipt of the response to the electronic message, the source 12 of the electronic message or another party may transmit a request for information regarding the rejection, such as for access to the record containing information regarding the rejection. In this regard, a web site, web portal or other online resource may be accessed in order to request information from the record regarding the rejection. Typically, the requester, such as the source of the electronic message or another party, is prompted by the web site, web portal or the other online resource to enter a username and password, although other forms of identification may be utilized. In accordance with an example embodiment, the requester is also prompted by the web site, web portal or the other online resource to enter the temporary password received in the response to the electronic message with access to the information regarding the rejection being conditioned upon the provision of a valid temporary password.

In this example embodiment, a computing device 20, such as the computing device embodied by the service provider 14 or a different computing device also having access to the at least one database 30, includes means, such as the processing circuitry 22, the processor 24, the communication interface 28 or the like, for receiving the request for access to information from the record regarding the rejection of the action otherwise to be initiated by the electronic message. See block 70 of FIG. 4. This request includes the temporary password. As such, the computing device includes means, such as the processing circuitry, the processor or the like, for determining whether the temporary password remains valid. See block 72. For example, the computing device, such as the processing circuitry, is configured to determine whether the temporary password has been utilized within the limited time period during which the temporary password remains valid. If a determination is made that the temporary password is no longer valid, a response to the request for access to the information from the record regarding the rejection is constructed and transmitted to the requester denying the request for access. See block 74. However, if the temporary password is determined to remain valid, the computing device includes means, such as the processing circuitry, the processor, the communication interface or the like, for providing for access to information regarding the rejection included within the record that was created in response to the prior analysis of the electronic message. See block 76. For example, information regarding the rejection may be provided via the web site, web portal or other online resource accessed by the requester. In an embodiment in which the electronic message is an electronic healthcare message, the underlying rationale for the rejection may be provided, such as an indication that fulfillment of a prescription that was the subject of the electronic healthcare message would result in overutilization and/or an adverse drug-drug interaction as well as additional information regarding the other medications previously prescribed to the patient that would contribute to the overutilization or the drug-drug interaction.

In some embodiments, a healthcare professional, such as a pharmacist, a physician or other prescriber of medication, may determine that the prescription that was the subject of the electronic healthcare message and that was rejected based upon overutilization or an adverse drug-drug interaction should, in fact, be fulfilled, such as in an instance in which the patient requires a greater dosage to manage pain, e.g., in an instance in which a patient is battling cancer, is in hospice or is suffering from a disease that creates opioid tolerance. In these and other similar situations, the healthcare professional may construct a response to the rejection requesting that rejection be overridden and providing the rationale for which the override request is submitted. Upon receipt of the override request, the computing device 20, such as the processing circuitry 22, is configured to create a record for storage by the at least one database 30, such as by updating the record, e.g., the longitudinal record, associated with the patient, indicating the override request and to then process the electronic healthcare message to initiate the requested action, such as by exchanging messages with a request processor 16 and, in turn, with the source 12 of the electronic message in the manner set forth by blocks 52, 54, 56 and 68 of FIG. 3 without consideration of overutilization and/or drug-drug interaction created by the fulfillment of the prescription.

In accordance with this embodiment, subsequent rejections that would otherwise have been generated for electronic healthcare messages for the same medication or medical service that is the subject of the override request are suppressed, at least for a predetermined period of time following receipt of the override request. As such, subsequent electronic healthcare messages requesting fulfillment of a prescription for the same medication or the same medical service may be processed without consideration of overutilization or drug-drug interaction, at least for a predetermined period of time following receipt of the override request. As such, the healthcare professional who has chosen to override a rejection for overutilization or drug-drug interaction will not be repeatedly interrupted with rejections of subsequent requests for the fulfillment of a prescription for the same medication or for the same medical service, at least for a predetermined period of time following receipt of the override request.

As described above, the computing device 20, such as the processing circuitry 22, is configured to parse the electronic message into a plurality of fields, each of which includes different types of information. One field that is parsed from the electronic message may provide information regarding a purchaser of the product or service, such as the patient associated with an electronic healthcare request. See block 80 of FIG. 5. In this example embodiment and as shown in block 82, the computing device includes means, such as a processing circuitry, the processor 24 or the like, for comparing the purchaser, such as the patient, to a group of one or more predefined patients who have been flagged as a known or suspected diverter of medication, such as patients whose past behavior in conjunction with the fulfillment of prescriptions for medication, such as opioids, indicates a heightened risk that the patient has actually diverted the medication with an intent to abuse or to resell. The group of predefined patients may be provided by law enforcement or by another party and may be stored by the at least one database 30. In an instance in which the purchaser, such as the patient, is determined to not be a member of the group, the electronic message is processed as described above, such as in conjunction with the operations of FIG. 3. However, in an instance in which the purchaser, such as the patient, is identified to be a member of the group of potential diverters, the computing device of this example embodiment includes means, such as the processing circuitry, the processor or the like, for identifying the source 12 of the electronic message, such as the pharmacy or other prescriber who has submitted an electronic healthcare message, by parsing the electronic message to identify the field that includes information regarding the source and then determining the address of the source by accessing a table stored, for example, by the at least one database, associating a physical address with each source of electronic messages. See blocks 84 and 86 of FIG. 5.

The computing device 20 of this example embodiment includes means, such as the processing circuitry 22, the processor 24 or the like, for determining a law enforcement agency and contact information for the identified law enforcement agency that has jurisdiction in the locality that includes the physical address of the source, such as the street address at which the pharmacy or other prescriber is located. See block 88. For example, another table may be maintained by the at least one database 30 including a plurality of law enforcement agencies, contact information for the law enforcement agencies and the localities for which the various law enforcement agencies have jurisdictional authority. The computing device of this example embodiment also includes means, such as the processing circuitry, the processor, the communication interface 28 or the like, for causing a notification, such as an electronic message, a text message, or the like, to be provided to the law enforcement agency that has been identified to have jurisdictional authority for the location including the address of the source of the electronic message. See block 90. The notification provides an indication as to the purchaser, such as the patient, and the location at which the purchaser is believed to be located, e.g., the address of the source that transmitted the electronic message. Additionally, notification may provide an indication as to the purchaser, such as the patient, being suspected of being a diverter of medication, such as opioids. The computing device of an example embodiment comes also includes means, such as a processing circuitry, the processor, the communication interface or the like, for constructing a response to the electronic message that includes a rejection of the action that is otherwise to be initiated by the electronic message and then transmitting the response to the source of the electronic message. See block 92. The response of this example embodiment may also include information instructing the source that the law enforcement agency having jurisdictional authority for their location has been notified of the purchaser, such as the patient, who is a suspected diverter of the medication. This response is then transmitted to the source of the electronic message. As such, law enforcement personnel may be dispatched to the location, such as the pharmacy, the physician's office or the like, and have an opportunity to interact with the purchaser, such as the patient, to gather information regarding the potential diversionary activity of the patient, thereby curbing further diversion of the medication, such as opioids.

As described above, a method, computing device 20 and computer program product are therefore provided in order to generate and provide a temporary password to control access to information from the record created in response to the rejection of an action otherwise initiated by an electronic message. Thus, even in an instance in which a group of people, such as people that serve a particular role, are generally permitted access to information available, such as via a web site or a web portal, as a result of the assignment of user names and passwords to the group of people, access can be further controlled by also requiring entry of a temporary password. In an example embodiment, this temporary password may only be provided in response to the creation of a record following processing of an electronic message, such as an electronic message originating with person who is provided the temporary password. Additionally, the temporary password may be temporally limited and, as such, may only be valid for a period of time that is dependent upon a time associated with the electronic message or the response to the electronic message. Thus, the information generated in response to the electronic message and accessible, for example, via a web site or a web portal, may be further protected, even among a limited group of people to whom passwords and user names have been assigned, with the temporary passwords.

As noted above, FIGS. 3-5 are flowcharts illustrating the operations performed by a method, apparatus and computer program product, such as computing device 20 of FIG. 2, in accordance with one embodiment of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of a computing device employing an embodiment of the present invention and executed by processing circuitry 22, e.g., a processor 24, of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3-5, when executed, convert a computer or processing circuitry into a particular machine configured to perform an example embodiment of the present invention. Accordingly, the operations of FIGS. 3-5 define an algorithm for configuring a computer or processing circuitry, e.g., processor, to perform an example embodiment. In some cases, a general purpose computer may be provided with an instance of the processor which performs the algorithms of FIGS. 3-5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to generate and provide a temporary password to control access to a record created in response to an electronic message, the computing device comprising:

a communication interface configured to receive electronic messages;

at least one database; and processing circuitry configured to:

for a respective electronic message, parse the electronic message to separately identify a plurality of fields of the electronic message providing different types of information;

access one or more records from the at least one database that are associated with the information provided by at least one field of the electronic message;

determine whether an action to be initiated by the electronic message is to be taken or is to be rejected based upon information provided by one or more fields of the electronic message and also based upon information from one or more records accessed from the at least one database that are associated with the information provided by at least one field of the electronic message;

in an instance in which the action is determined to be rejected, create a record comprising information regarding the electronic message and information regarding a rejection of the action to be initiated by the electronic message;

generate the temporary password to facilitate controlled access to the record created regarding the electronic message and the information regarding the rejection; and construct a response to the electronic message that is to be transmitted, wherein the response includes the temporary password and an indication of the rejection, wherein the at least one database is also configured to store one or more of the electronic message, the record created regarding the electronic message and the information regarding the rejection or the response to the electronic message.

2. A computing device according to claim 1 wherein the processing circuitry is configured to generate the temporary password so as to be temporally limited.

3. A computing device according to claim 1 wherein the processing circuitry is configured to construct the response to include the indication of the rejection with less information regarding the rejection than is included within the record that has been created.

4. A computing device according to claim 1 wherein the processing circuitry is further configured to permit access to the information regarding the rejection that is included within the record that is created in a manner that is controlled based upon the temporary password.

5. A computing device according to claim 1 wherein the processing circuitry is configured to parse the electronic message to identify a first field identifying a purchaser of a product or service, a second field identifying the product or service and a third field identifying a quantity associated with the product or service.

6. A computing device according to claim 5 wherein the processing circuitry is configured to access one or more records from the at least one database that are associated with the purchaser identified by the first field of the electronic message.

7. A computing device according to claim 6 wherein the processing circuitry is configured to determine whether the action to be initiated by the electronic message is to be taken or is to be rejected based upon an analysis of one or more of the product or service or the quantity identified by the second and third fields, respectively, of the electronic message and information from the one or more records accessed from the at least one database that are associated with the purchaser identified by the first field of the electronic message.

8. A computing device according to claim 7 wherein the processing circuitry is configured to determine that the action is to be rejected due to a drug-to-drug interaction or overutilization identified by the analysis.

9. A method for generating and providing a temporary password to control access to a record created in response to an electronic message, the method comprising:
   receiving a plurality of electronic messages;
   for a respective electronic message, parsing the electronic message to separately identify a plurality of fields of the electronic message providing different types of information;
   accessing one or more records from at least one database that are associated with the information provided by at least one field of the electronic message;
   determining whether an action to be initiated by the electronic message is to be taken or is to be rejected based upon information provided by one or more fields of the electronic message and also based upon information from one or more records accessed from the at least one database that are associated with the information provided by at least one field of the electronic message;
   in an instance in which the action is determined to be rejected, creating a record comprising information regarding the electronic message and information regarding a rejection of the action to be initiated by the electronic message;
   generating the temporary password to facilitate controlled access to the record created regarding the electronic message and the information regarding the rejection;
   constructing a response to the electronic message that is to be transmitted, wherein the response includes the temporary password and an indication of the rejection; and
   storing, in the at least one database, one or more of the electronic message, the record created regarding the electronic message and the information regarding the rejection or the response to the electronic message.

10. A method according to claim 9 wherein generating the temporary password comprises generating the temporary password so as to be temporally limited.

11. A method according to claim 9 wherein constructing the response comprises constructing the response to include the indication of the rejection with less information regarding the rejection than is included within the record that has been created.

12. A method according to claim 9 further comprising permitting access to the information regarding the rejection that is included within the record that is created in a manner that is controlled based upon the temporary password.

13. A method according to claim 9 wherein parsing the electronic message comprises parsing the electronic message to identify a first field identifying a purchaser of a product or service, a second field identifying the product or service and a third field identifying a quantity associated with the product or service.

14. A method according to claim 13 wherein accessing one or more records from at least one database comprises accessing one or more records from the at least one database that are associated with the purchaser identified by the first field of the electronic message.

15. A method according to claim 14 wherein determining whether the action to be initiated by the electronic message is to be taken or is to be rejected is based upon an analysis of one or more of the product or service or the quantity identified by the second and third fields, respectively, of the electronic message and information from the one or more records accessed from the at least one database that are associated with the purchaser identified by the first field of the electronic message.

16. A method according to claim 15 wherein determining whether the action to be initiated by the electronic message is to be taken or is to be rejected comprises determining that the action is to be rejected due to a drug-to-drug interaction or overutilization identified by the analysis.

17. A computer program product configured to parse and differently process electronic messages, the computer program product comprising a non-transitory computer readable medium having program code stored thereon, the program code comprising program code instructions configured, upon execution, to:
   receive electronic messages;
   for a respective electronic message, parse the electronic message to separately identify a plurality of fields of the electronic message providing different types of information;
   access one or more records from at least one database that are associated with the information provided by at least one field of the electronic message;
   determine whether an action to be initiated by the electronic message is to be taken or is to be rejected based upon information provided by one or more fields of the electronic message and also based upon information from one or more records accessed from the at least one database that are associated with the information provided by at least one field of the electronic message;
   in an instance in which the action is determined to be rejected, create a record comprising information regarding the electronic message and information regarding a rejection of the action to be initiated by the electronic message;
   generate the temporary password to facilitate controlled access to the record created regarding the electronic message and the information regarding the rejection;
   construct a response to the electronic message that is to be transmitted, wherein the response includes the temporary password and an indication of the rejection; and
   cause storage, in the at least one database, of one or more of the electronic message, the record created regarding the electronic message and the information regarding the rejection or the response to the electronic message.

18. A computer program product according to claim 17 wherein the program code instructions are configured to generate the temporary password so as to be temporally limited.

19. A computer program product according to claim 17 wherein the program code instructions are configured to construct the response to include the indication of the rejection with less information regarding the rejection than is included within the record that has been created.

20. A computer program product according to claim 17 wherein the program code further comprises program code instructions configured, upon execution, to permit access to the information regarding the rejection that is included within the record that is created in a manner that is controlled based upon the temporary password.

* * * * *